US010455015B2

(12) United States Patent
Procopio et al.

(10) Patent No.: US 10,455,015 B2
(45) Date of Patent: Oct. 22, 2019

(54) SYSTEM AND METHOD FOR AUTOMATIC CLOUD-BASED FULL-DATA BACKUP AND RESTORE ON MOBILE DEVICES

(71) Applicant: Google Inc., Mountain View, CA (US)

(72) Inventors: Michael Jeffrey Procopio, Boulder, CO (US); Christiaan Prins, Oakland, CA (US); Ramesh Nagarajan, Balmain (AU); Ushasree Kode, Fremont, CA (US); Christopher Tate, Berkeley, CA (US); Di Wu, Sunnyvale, CA (US); Reuben Kan, Carlingford (AU); John Herndon, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 279 days.

(21) Appl. No.: 15/156,539

(22) Filed: May 17, 2016

(65) Prior Publication Data

US 2016/0352827 A1 Dec. 1, 2016

Related U.S. Application Data

(60) Provisional application No. 62/167,148, filed on May 27, 2015.

(51) Int. Cl.
*G06F 13/00* (2006.01)
*H04L 29/08* (2006.01)
(Continued)

(52) U.S. Cl.
CPC ...... *H04L 67/1095* (2013.01); *G06F 11/1451* (2013.01); *G06F 11/1458* (2013.01);
(Continued)

(58) Field of Classification Search
CPC ........ G06Q 30/02; G06Q 10/10; H04L 29/06; H04L 29/0809; H04L 29/08072;
(Continued)

(56) References Cited

U.S. PATENT DOCUMENTS 7,860,839 B2 12/2010 Cisler et al.
8,250,102 B2 8/2012 Madhavarapu et al.
(Continued)

FOREIGN PATENT DOCUMENTS

EP 2580675 4/2013
JP 2003280825 10/2003
(Continued)

OTHER PUBLICATIONS

Office of Information Technology Montclaim State University, "Microsoft Word: Tracking Changes to a Document" pp. 1-3; Nov. 17, 2006.*
(Continued)

*Primary Examiner* — Robert B Harrell
(74) *Attorney, Agent, or Firm* — Lowenstein Sandler LLP

(57) ABSTRACT

A method for storing third-party application data to cloud storage is described herein. The method includes determining to upload data associated with a third-party application stored on a client device to a cloud storage server. The data associated with the third-party application includes both binary data and metadata. The method further includes storing the binary data of the third-party application at a first cloud storage location. The first cloud storage location has a storage address and the metadata is updated to include the storage address. The method includes storing the updated metadata to a second cloud storage location different from the first cloud storage location.

20 Claims, 6 Drawing Sheets

(51) Int. Cl.
*H04L 29/06* (2006.01)
*G06F 11/14* (2006.01)

(52) U.S. Cl.
CPC ...... *G06F 11/1461* (2013.01); *G06F 11/1464* (2013.01); *H04L 67/1097* (2013.01); *H04L 67/42* (2013.01)

(58) Field of Classification Search
CPC ......... H04L 29/08117; H04L 29/06047; H04L 67/1095; H04L 12/58; H04L 29/08; H04L 51/04; H04L 67/02; H04L 67/1097; H04L 67/42; G06F 13/00; G06F 17/3002; G06F 17/30017; G06F 17/30067; G06F 11/1451; G06F 11/1458; G06F 11/1461; G06F 11/1464
USPC .................................. 709/203, 219; 707/829
See application file for complete search history.

(56) References Cited

U.S. PATENT DOCUMENTS

| | | | |
|---|---|---|---|
| 8,291,170 | B1 | 10/2012 | Zhang et al. |
| 8,311,988 | B2 | 11/2012 | Cisler et al. |
| 8,694,744 | B1 | 4/2014 | Raj et al. |
| 8,751,457 | B2 | 6/2014 | Grigg et al. |
| 8,782,441 | B1 | 7/2014 | Osterwalder et al. |
| 8,868,882 | B2 | 10/2014 | Ali et al. |
| 2002/0156921 | A1 | 10/2002 | Dutta et al. |
| 2009/0307333 | A1 | 12/2009 | Welingkar et al. |
| 2011/0016089 | A1 | 1/2011 | Freedman et al. |
| 2011/0252233 | A1 | 10/2011 | De Atley et al. |
| 2012/0084261 | A1 | 4/2012 | Parab |
| 2012/0124507 | A1 | 5/2012 | Paterson et al. |
| 2012/0310894 | A1 | 12/2012 | Freedman |
| 2013/0304706 | A1 | 11/2013 | MacInnis |
| 2013/0311597 | A1 | 11/2013 | Arrouye et al. |
| 2014/0006551 | A1 | 1/2014 | Yao |
| 2014/0095625 | A1 | 4/2014 | Quan et al. |
| 2014/0358862 | A1 | 12/2014 | Levien et al. |
| 2016/0088077 | A1* | 3/2016 | Liu ............... H04L 67/1095 709/203 |

FOREIGN PATENT DOCUMENTS

| | | |
|---|---|---|
| JP | 2004021424 | 1/2004 |
| JP | 2013033433 | 2/2013 |
| JP | 2014519122 | 8/2014 |
| KR | 20120069400 A | 6/2012 |
| WO | WO-2005048083 | 5/2005 |
| WO | WO-2014055601 | 4/2014 |

OTHER PUBLICATIONS

PCT International Search Report and Written Opinion for International Application No. PCT/US2016/032878, dated Sep. 30, 2016, 8 pages.
Japanese Office Action for Japanese Application No. 2017-551132, dated Nov. 9, 2018, 6 pages 35 pages.

* cited by examiner

SYSTEM AND METHOD FOR AUTOMATIC CLOUD-BASED FULL-DATA BACKUP AND RESTORE ON MOBILE DEVICES

CROSS REFERENCE TO RELATED APPLICATIONS

This application claims the benefit of U.S. Provisional Application No. 62/167,148 filed May 27, 2015 and is related to PCT Application Number PCT/US2016/032878 filed May 17, 2016, each of which is incorporated herein in its entirety.

FIELD OF THE INVENTION

In general, this disclosure relates to systems and methods for backing up data to cloud storage and restoring data to a mobile device from cloud storage.

BACKGROUND

Use of mobile devices is increasing as global usage patterns shift toward content consumption, creation and management on mobile devices. However, mobile devices are a poor platform for data preservation. They are easily damaged or rendered inoperable, often resulting in loss of locally stored content or data. Inaccessible data and content following failure of the mobile device may be due to technical reasons or insufficient data backup functions.

Additionally, users of mobile devices upgrade their devices frequently. In setting up a new device, the user experience is often hindered due to loss of application data and associated settings. This can require the user to set up a new device from scratch and may result in the loss of important data associated with third-party applications, such as text messages, photos, application preferences, or any other suitable third-party application data. Existing backup technologies often rely on the use of key-value pairs, which only back up certain aspects of third-party application data. Using key-value pairs for restoring a third-party application to a client device may restore application settings, but may not restore additional content of the third-party application. Thus a third-party application with settings backed up and saved as key-value pairs may result in the restoration of the third-party application environment according to user settings, but the loss of third-party application content generated or stored in the third-party application by the user. Moreover, existing systems may require developers of third-party applications to specifically configure the third-party applications to allow backup, or require the user to opt in to the backup or trigger the backup manually.

SUMMARY

Systems and methods are disclosed herein for the full-data backup of application data to cloud storage on a per-application basis to make the backup and restoration of data associated with third-party applications more efficient and reliable. A full-data backup includes all data associated with a third-party application including all binary data and metadata associated with settings, environment, application history, user preferences and application content, as well as any other data associated with the third-party application that may be used to run the third-party application or create the third-party application environment. Data backups may be periodically initiated by the client device backup framework when it has been determined that a backup should occur. Third-party application data for each application is uploaded to a cloud storage location. In particular, the third-party application data may include two forms of data: binary data and metadata. In this case, the binary data may be stored separately from the metadata. An identifier that includes the storage location of the binary data may be appended to the metadata, such that the appended metadata includes a reference to the cloud storage address of the binary data. Binary data and metadata have different properties, and may have different optimal storage solutions. For example, binary data storage may require a means for the storage of large amounts of data and the rapid sequential read access of bytes. The binary storage may or may not be searchable or otherwise indexed. Metadata storage may have capabilities related to the rapid storage of non-binary data along with creating hierarchical relationships and propagation of metadata such as ownership data across related folders and files. Metadata storage also includes means for searching stored metadata and is equipped to handle such searches rapidly to support expected user interface response times.

When a user wishes to restore third-party application data to a client device, the user may initiate a device restore process, which restores the third-party application data from the cloud storage to the client device. Because third-party application data is restored from full-data backups including both settings and content, data loss is reduced. The third-party application, the application environment and the third-party application content are restored from the backup so that a seamless transition to a new device is achieved. Restoring from the full-data backups stored in the cloud storage allows a user to restore a device back to the exact state as a previous device, including installed apps, settings, and optionally additional content, such as photos, text, and audio or video files.

In one aspect, a method for storing third-party application data to cloud storage includes determining to upload data associated with a third-party application stored on a client device to a cloud storage server. The data associated with the third-party application includes both binary data and metadata. The method further includes storing the binary data of the third-party application at a first cloud storage location. The first cloud storage location has a storage address and the metadata is updated to include the storage address. The method then includes storing the updated metadata to a second cloud storage location different from the first cloud storage location.

In some implementations, the binary data of the third-party application includes full data for the third-party application. In some implementations, the client device determines whether to upload the data by identifying stored binary data associated with the third-party application that is stored on the client device. In some implementations, the client device also identifies the previously uploaded binary data associated with the third-party application and computes a difference between the stored binary data and the previously uploaded binary data. The client device compares the difference to a threshold. If the difference is equal to or exceeds the threshold, the client device determines to upload the data associated with the third-party application.

In some implementations, the client device stores data associated with a plurality of third-party applications and each third-party application in the plurality of third-party applications is associated with corresponding binary data and corresponding metadata. The corresponding binary data and the corresponding metadata for each third-party application are uploaded from the client device in a single upload. In some implementations, the data associated with the third-party application is not duplicated in full on the client device prior to downloading the data. In some implementations, the client device determines to upload the data associated with the third-party application based on a predetermined upload schedule. In some implementations, the client device determines to upload the data associated with the third-party application based on detection of changes to the third-party application reported by the third-party application. In some implementations, the client device determines to upload the data associated with the third-party application when the client device receives a backup request from a user of the client device.

In some implementations, the client device is configured to aggregate the binary data and the metadata of the third-party application into a single file and transmit the file to an upload server in the cloud storage. The upload server is configured to separate the binary data from the metadata, transmit the binary data for storage in the first cloud storage location, append the storage address of the first cloud storage location to the metadata to obtain the updated metadata and transmit the updated metadata for storage in the second cloud storage location.

In another aspect, a method for providing restoration of third-party application data to a client device includes determining whether to provide data associated with a third-party application to the client device. The data associated with the third-party application includes binary data stored in a first cloud storage location having a storage address, and metadata stored in a second cloud storage location. The method further includes using the metadata to determine the storage address of the first cloud storage location and providing the binary data from the first cloud storage location to the client device.

In some implementations, the binary data of the third-party application includes full data for the third-party application. In some implementations, the client device stores data associated with a plurality of third-party applications. Each third-party application in the plurality of third-party applications is associated with corresponding binary data and corresponding metadata, and the corresponding binary data for each third-party application are downloaded to the client device in a single download. In some implementations, the client device determines to download the data associated with the third-party application when the client device receives a restore request from a user of the client device. In some implementations, the data associated with the third-party application includes application data, user preferences and application content. In some implementations, the client device is a first client device, and the binary data and the updated metadata are downloaded to a second client device, such that the third-party application data on the first client device is synchronized with third-party application data on the second device.

In some implementations, the binary data and the metadata are transmitted to a download server in the cloud storage, wherein the download server previously wrote the binary data to the first cloud storage location and previously transmitted the metadata for writing to the second cloud storage location. In some implementations, the download server previously transmitted the metadata to a cloud storage service configured to read the updated metadata from the second cloud storage location and write the updated metadata to the second cloud storage location. In some implementations, data associated with another third-party application includes metadata stored in a third cloud storage location and does not include binary data. In some implementations the method for providing restoration of third-party application data to a client device also includes determining whether to provide the data associated with the other third-party application to the client device, identifying the metadata associated with the other third-party application as a set of key-value pairs stored in the third cloud storage location and providing the set of key-value pairs to the client device.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
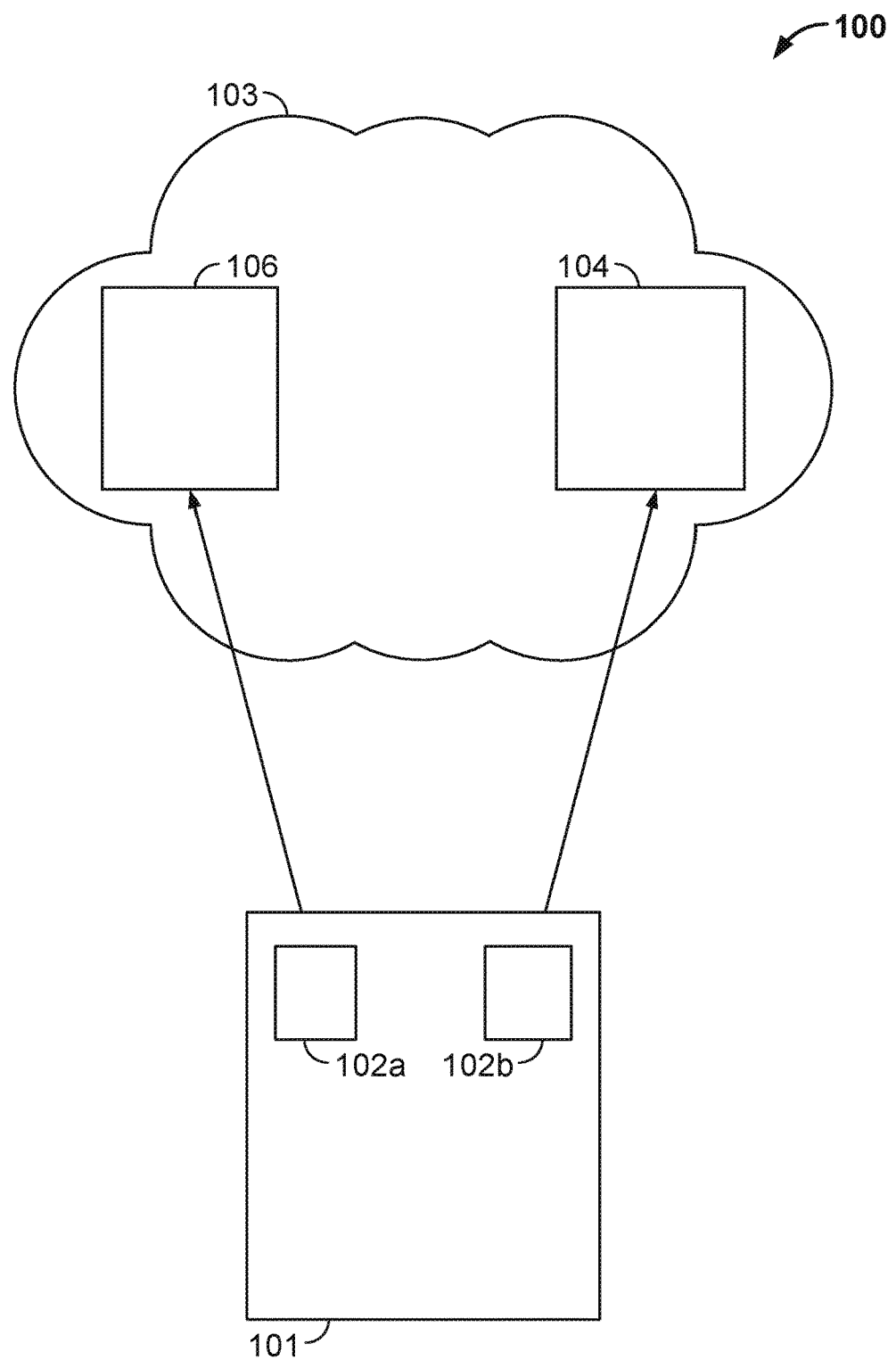
FIG. 1 is a block diagram of a system for uploading data to a cloud storage service, according to an illustrative embodiment.

To provide an overall understanding of the systems and methods described herein, certain embodiments will now be described, including a system for the backup and restoration of third-party application data on a client device. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

As described herein, the present disclosure provides a system and method that performs backing up of full-data associated with a third-party application. Instead of key-value pairs associated with third-party application settings, the full-data associated with the third-party application including settings, history, and content is uploaded to cloud storage. Both binary data and metadata associated with third-party applications are backed up by uploading to cloud storage. Metadata for a third-party application may include file name, size, passcode or identifying number, history of the file, description, current version of operating system the third-party application is designed for, and other static metadata. Other files and data in addition to third-party application specific data may also be backed up using a similar method. Such data may include a memory card, SD card, downloads folder, or other data repositories not associated with individual apps' data. Additionally, these and other files and data backed up into cloud storage may be exposed to a user in a cloud-based file storage system user interface as fully operable and visible files.

Backup of third-party application data may occur according to a predetermined schedule or as there are changes to third-party application data. For example, a predetermined schedule may require a backup of third-party application data every fixed interval, such as once a day, once a week, once a month, or any other suitable frequency. As another example, backup may be initiated automatically when it is determined that at least a threshold amount of changes have been made to the third-party application data. In particular, changes to third-party application data may include changes to internal third-party application databases or settings. In some embodiments, changes to third-party applications are recorded in a folder associated with the application. These changes may be accessed by the client device backup framework to determine whether and upload is required.

In some embodiments, the client device may be configured to allow the user to customize settings related to the backup. For example, when the client device is a mobile phone, it may be undesirable for the mobile phone to upload third-party application data to cloud storage when the mobile phone is connected to a cellular network, as doing so would consume data in the user's data plan. In this case, the client device may be configured to only perform the backup when the mobile device is connected to a fast, reliable, and/or cheap network, such as a wireless internet network. Alternatively, the user may select one or more options to enable backup over a cellular network. The backup may be configured so that required backups determined for multiple third-party applications are grouped together and all uploads for those multiple third-party applications are performed one after the other during an upload session. Multiple required backups for more than one third-party application may also occur continuously as changes are made to third-party application data. Backups may also be configured to occur only when specific device requirements are met, such as when a mobile device is plugged into a power source, or during idle or non-peak usage hours, such as at night.

FIG. 1 shows a block diagram of a system 100 for uploading data to a cloud storage service. The system includes a client device 101, applications 102a and 102b (generally, application 102), cloud storage 103, a first cloud storage location 104, and a second cloud storage location 106. The client device 101 includes third-party applications 102 which include associated data. The data may include both binary data and metadata. The client device determines that an upload should occur. The determination that an upload should occur may be triggered by a user action, a timed upload or an upload based on changes to the third-party applications and application data which may be user-initiated or otherwise. The client device 101 transmits the binary data and the metadata of the third-party application to cloud storage 103. The binary data of the third-party application is stored at a first cloud storage location 104 and the metadata of the third-party application is stored at a second cloud storage location 106 within the cloud storage 103.

Data Upload

Figure 2:
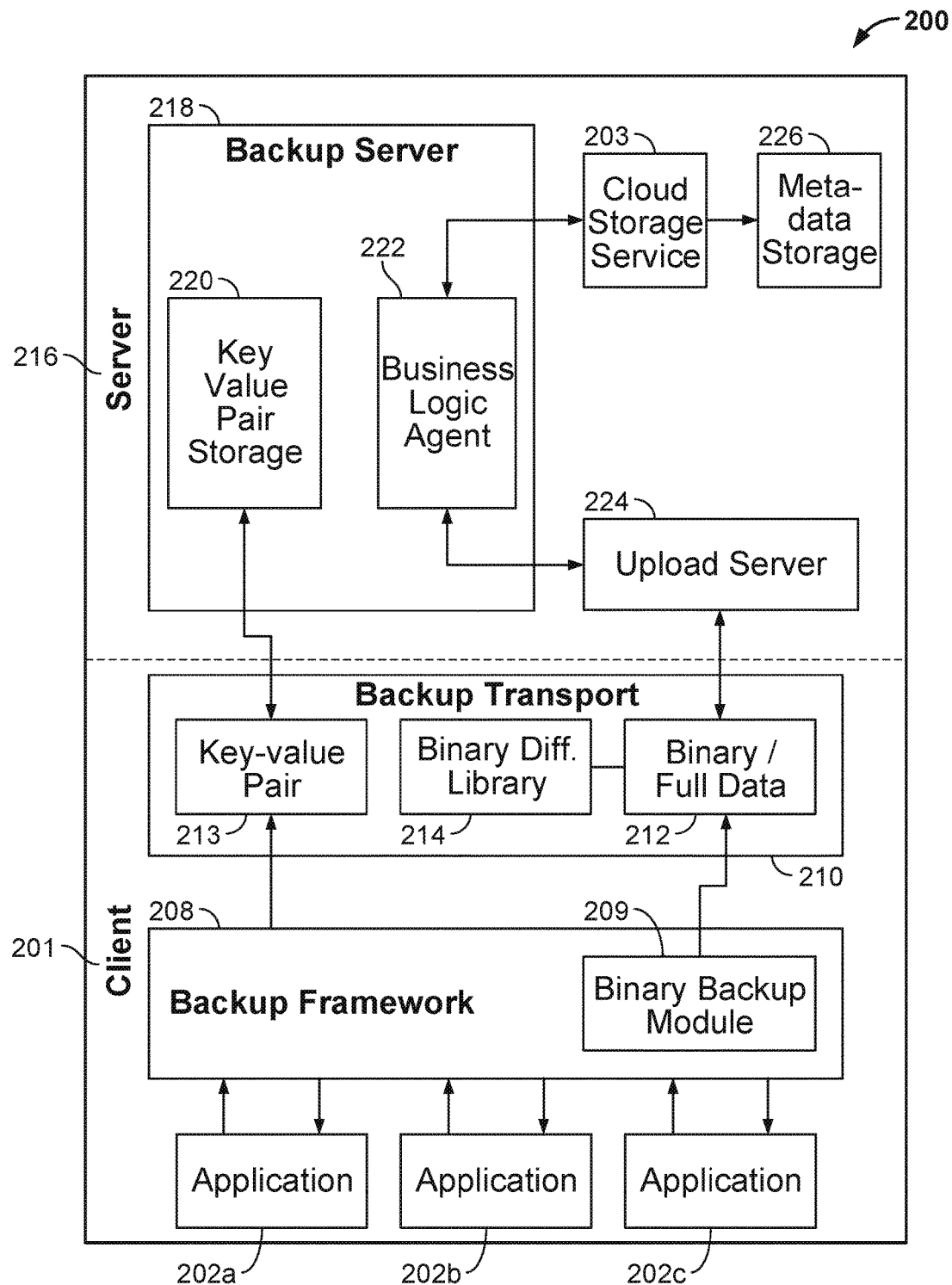
FIG. 2 is a block diagram of a client device and a server configured to cooperate to carry out a data upload process, according to an illustrative embodiment.

FIG. 2 is a block diagram of a system 200 configured to cooperate to carry out a data upload process. System 200 includes a backup framework 208, a backup transport 210 and third-party applications 202a, 202b, 202c on a client device 201 (e.g., on the "client side") and a backup server 218, upload server 224, cloud storage service 203, and metadata storage 226 on a server 216 (e.g., on the "server side"). The client device 201 may include a mobile device such as a phone or tablet. While the client device 201 is often described herein as being a mobile device, one of ordinary skill in the art will understand that the systems and methods of the present disclosure are also applicable to performing backup and restore of application data on any number of computing devices, including desktop computers, laptops, or any other suitable computing device. The client device 201 stores data associated with third-party applications 202a, 202b, 202c, which are in communication with a backup framework 208 containing a binary backup module 209. The backup framework 208 is in communication with a backup transport 210. The backup framework 208 exists in the device memory and is configured to determine whether the third-party applications 202a, 202b, 202c require backup, either by reference to a predetermined schedule or in response to detection of changes in the application data. The backup framework 208 is configured to allow the comparison of binary application data to previous backups of the third-party application data to determine whether there is a change in the data. This may be accomplished by a checksum calculation or by determining if there are any application changes recorded in application change folders.

After the client device 201 determines that there is a need for a backup, the binary backup module 209 archives the application data to be uploaded into a single file and sends the file to the backup transport 210. The backup transport 210 in FIG. 2 includes two different data types that various methods of backup may use. In particular, as is shown in FIG. 2, the backup transport includes a key-value pair section 213 and a full-data backup section 212 that includes binary data. In general, other suitable data types may be used without departing from the scope of the present disclosure. After the application data has been sent from the backup framework 208 to the backup transport 210, the client device 201 calls to the server 216 to begin the upload process.

As is depicted in FIG. 2, the server 216 includes an upload server 224, a backup server 218 containing key-value pair storage 220 and a business logic agent 222, a cloud storage service 203, and a metadata storage unit 226. The upload server 224 handles the uploaded binary data and is configured to call to the business logic agent 222 in the backup server 218 to initiate the storage of associated metadata and the creation of location references which can be used to retrieve the data during a future restore request. The backup server 218 receives requests from the upload server 224 and passes these requests to the cloud storage service 203, which prepares metadata for storage in the metadata storage 226. Additionally, structured data related to backups of the client device may be stored in a key-value pair storage 220. The structured data may include the device ID, third-party application ID and references to the storage locations of third-party application data stored in cloud storage received as a part of the upload method. It may include additional information including client device type and date of manufacture, timestamps related to recent backups, and information related to the versions of backup framework 208 on the client device 201.

Figure 3:
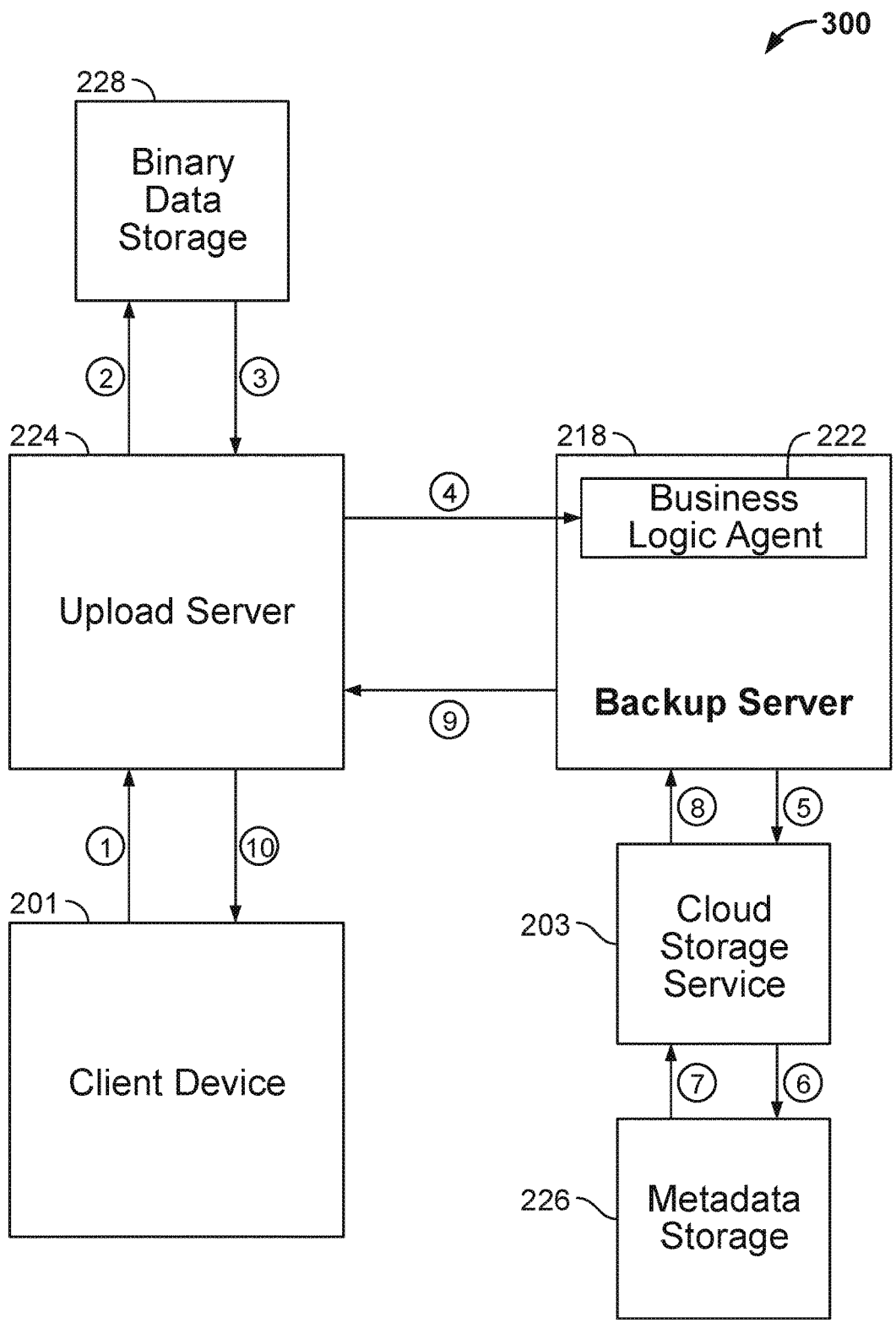
FIG. 3 is a block diagram showing an illustrative method for uploading third-party application data, according to an illustrative embodiment.

In some embodiments, the upload of third-party application data is accomplished through a series of steps. These steps are illustrated and enumerated in FIG. 3 with some of the components described in relation to FIG. 2:

In step 1 of FIG. 3, when a need for a data upload is determined by the client device backup framework 208, a backup request message is generated with basic metadata related to the third-party applications 202a, 202b, 202c requiring backup. The backup request message is sent from the client device 201 to the upload server 224. The client device backup framework 208 creates a tarball (a .tar archive file) for each third-party application 202a, 202b, 202c requiring a new backup. The client device backup transport 210 initiates the upload of the third-party application data tarballs to the upload server 224 by passing on the backup request message to the upload server 224. The client device backup transport 210 also provides metadata related to the third-party application data upload to the upload server 224. The upload server 224 receives the file via a standard upload, binary differential method or a chunked or resumable upload. In embodiments which include binary differential uploads, the binary and metadata to be uploaded may be staged in a binary diff library 214 located on the client device 201. The third-party application data to be uploaded may be determined by a checksum method such that only the differences between the third-party application data on the client device 201 compared to existing stored data is uploaded, along with a structure describing the differences between the two data files.

At step 2, the upload server 224 writes the received third-party application binary data to the binary data storage 223. The binary data storage 228 is a cloud storage location which is designed for storage of large amounts of binary data. The binary data storage 228 can sequentially read access to bytes and serve them in response to a called location. The third-party application metadata is removed for storage in a second cloud storage location (e.g., at the metadata storage 226 in FIG. 2).

At step 3, the upload server 224 receives a binary data storage location reference for the third-party application binary data which includes the file location of the uploaded third-party application data. The binary data storage location reference is a numerical string that can be used to look up the location in the binary data storage 228 where the third-party application data has been stored.

At step 4, the upload server 224 provides the binary data storage location reference for the third-party application data to a business logic agent 222 within the backup server 218 which clones the binary data location reference. The upload server 224 also provides the third-party application metadata to the backup server 218.

At step 5, the backup server 218 passes the binary data storage location reference to the cloud storage service 203 along with the third-party application metadata associated with the stored binary data. The backup server 218 creates files and folders as required for the correct storage of the metadata. The cloud storage service 203 is able to read and write files to the metadata storage 226.

At step 6, the cloud storage service 203 uses the received third-party application metadata and the binary data storage location reference and appends the binary data storage location reference to the metadata entry. Additional descriptors may also be appended to the third-party application metadata such as instructions to not count storage space for third-party application data against a user's storage quota. The cloud storage service 203 creates appropriate entries and folders for the storage of the third-party application metadata in the metadata storage 226. The cloud storage service 203 writes the third-party application data to metadata storage 226. The metadata storage 226 is a cloud storage equipped to store metadata.

At step 7, the metadata storage 226 returns a success signal signifying the successful storage of the third-party application metadata. The success signal includes a reference to the location of the metadata, such that the success signal may be used to look up the location of the metadata.

At step 8, the cloud storage service 203 passes the success signal to the backup server 218 which records the success signal.

At step 9, the backup server 218 passes the success signal to the upload server 224.

At step 10, the upload server 224 returns the success signal to the client device 201.

Binary data is uploaded to the upload server 224 and stored in the binary data storage 228. Batching of third-party application data may occur in the upload server 224. The corresponding metadata is appended with the reference to the binary data storage location and stored in the metadata storage 226. The storage of the metadata in the metadata storage 226 location is aided by the cloud storage service 203. After the metadata is successfully stored, a success signal is generated by the metadata storage service 226 and passed back to the backup server 218 to the upload server 224 and finally to the client device 201. The success signal indicates that the third-party application data has been successfully uploaded and stored in cloud storage.

In some embodiments, third-party application data is uploaded from the mobile device to the cloud storage per application as a single file. The third-party application data for a single third-party application, for example 202a, 202b, or 202c in FIG. 2, may be uploaded as a .tar type archive file. Files of this type may be referred to herein as tarballs. Performing the backup on a per-application basis may be advantageous at least because doing so may increase the likelihood of a successful upload. In particular, it may be preferable to upload one file at a time per third-party application, rather than batching the changes to multiple third-party applications together. Uploads that involve large files are more prone to failure than those that involve smaller files. If there is a problem with an upload, only the application data for a single third-party application needs to be re-uploaded. In this manner, an upload containing only application data related to a single third-party application will therefore take less time and the upload will be more efficient.

The use of a single file upload per third-party application 202a, 202b, 202c during backup requires only small amounts of temporary storage prior to the upload process. The upload process of the third-party application data may be performed such that the data is not duplicated in a local cache prior to upload, but is streamed directly. Thus, the entire backup payload is never created on disk. Each third-party application data upload may be processed and uploaded as a single pass in order to ensure that the uploaded third-party application data is coherent. Uploading the third-party application data in more than one pass may result in the creation of an incoherent upload process if there is a change in the third-party application data between two passes.

In some embodiments, it may be difficult to upload the third-party application data in a single pass. This may occur if the upload server 224 requires a manifest of byte ranges being sent to the server be provided at the beginning of the upload. In such cases, a single pass upload may not be able to occur because a full pass must first be made through the third-party application data files to compute the manifest. In this case, there may not be enough disk space to stage the file for processing. A second pass through the third-party application data file for preparation for upload may not be guaranteed to be the same third-party application data snapshot as the first pass through. By interleaving diff manifest information, such a case may be supported. For example, a single pass upload script may be specified using the format: {use server copy bytes 0 100, upload these 20 bytes, use server bytes 120-150}.

Third-party application data backed up to cloud storage is stored as per-app backup data. Only the latest revision of the third-party application data is stored in a location in the cloud storage. Optionally, the upload of data may be accomplished by a binary differential method in which only changed data is uploaded to the cloud storage. Using a binary differential method, the current state of the third-party application data is compared to a previously uploaded backup and a determination is made of what changes have occurred in the third-party application data. The comparison of current third-party application data with previous third-party application data backup may be accomplished by a checksum method. In this approach, checksums on custom chunk sizes of the last upload of third-party application data are computed locally on the client device. Rather than uploading the entire set of raw third-party application data, only data indicative of the differences may be uploaded to the cloud storage, thereby conserving bandwidth and decreasing the time required for the backup upload. Using binary differential protocol for determining changes to third-party application data to be uploaded therefore improves the efficiency of the single upload per third-party application method.

In some embodiments, the binary differential method is used to determine whether an upload of third-party application data should be performed and to determine which changes have occurred to the third party application data and what should be uploaded to the cloud storage. The client device backup transport reads data from the third-party application data and processes it incrementally. The client device backup framework stores at least one checksum chunk. For each byte that the client device backup transport reads, a rolling checksum of the last N bytes is computed and compared to the checksum of the chunks associated with the last upload. The checksum of the chunks from the last upload of the third-party application data is stored on the server and downloaded for comparison. If there is no match between the newly computed checksum and the stored checksum, the oldest byte is sent to the server. If there is a match, the chunk is not uploaded to the cloud storage.

In some embodiments, the backup of third-party application data is configured to be automatic and to occur according to a set schedule. The third-party application data backup and upload may be automatic and common to all third-party applications 202a, 202b, 202c such that the developers of third-party applications are not required to alter their third-party application configurations in any way in order to back up the third-party application data in this system. Developers of third-party applications 202a, 202b, 202c may opt out of the backup by changing the configuration details or manifest of their third-party applications 202a, 202b, 202c. Examples of third-party applications 202a, 202b, 202c for which a full data backup may not be advisable are financial applications, password storage applications or authenticators. These third-party applications 202a, 202b, 202c with developers who have opted out of the automatic backup may still be backed up by alternate manual mechanisms by the user or third-party application 202a, 202b, 202c.

Once the third-party application data has been uploaded to and stored in cloud storage, the backup of the third-party application data may be hidden from a view of the user but still associated with the user's cloud storage account. Alternatively, the backup of the third-party application data may be accessible to the user through a user interface in the cloud storage file system. Accessing the backup of the third-party application data through the user interface allows the user to make changes or manipulate the third-party application data or other data while in the cloud storage system. For example, a backup of data related to a photo-editing third-party application may include edited or unedited photos which the user may access and edit or manipulate in the backup files through a user interface of the cloud storage file system associated with his or her account. A user may also access the backup of the third-party application data in order to delete a backup of the data.

In some embodiments, the backup of the third-party application data is stored in hierarchical folders in the cloud storage system. The third-party application binary data and metadata may be stored within a folder associated with the user. The folders which contain backup data are organized in such a way so that the client device and the third-party application are identifiable. This may include an Object Family Root Folder associated with the third-party application data backups for a client device, client device ID, stored third-party application data backups, application signifier such as name and in some cases the tarball for the third-party application data file. The Object Family Root Folder may not be available to the user despite being associated with the user's account. This folder may also not be synced during syncing events.

Data Restore

Figure 4:
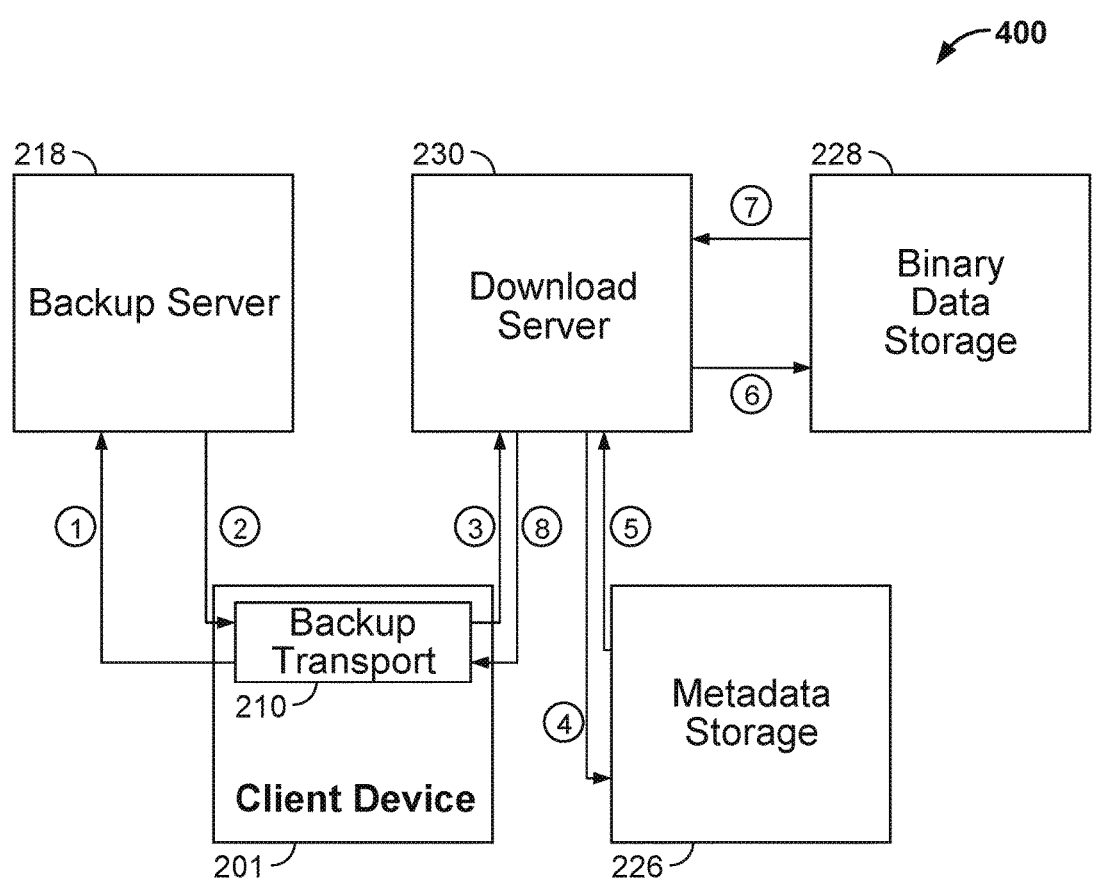
FIG. 4 is a block diagram showing an illustrative method for restoring third-party application data from the cloud storage system to a device, according to an illustrative embodiment.

In accordance with the systems and methods of the present disclosure, the third-party application data that is stored in cloud storage may be restored to a client device 201. To implement the restoration path, the third-party application data may be retrieved following a command by the client device 201. During the restoration of third-party applications 202a, 202b, 202c, the upload server 224 may be configured to download data. In this instance the upload server 224 may be referred to as a download server 230. Restoring the third-party application data from the cloud storage system to a device can be done on a per-application basis using the following steps, illustrated in FIG. 4 with some of the components described in FIG. 2:

At step 1 of FIG. 4, upon restoration of a device, the client device 201 backup transport 210 initiates the third-party application data download by sending a device ID and a third-party application ID to the backup server 218. This identifies the client device 201 and user as well as the third-party application 202a, 202b, 202c for which data associated with the user is requested.

At step 2, the backup server 218, upon receiving the identifying information and third-party application data restore request from the client device 201, sends the success signal from the last successful backup of the third-party application data back to the client device 201. The success signal contains a reference to the metadata storage location.

At step 3, the client device backup transport 210 connects with the download server 230, sending the success signal with metadata storage location reference to the download server 230.

At step 4, the download server 230 uses the metadata storage location reference to request the third-party application metadata from the metadata storage 226.

At step 5, the download server 230 receives the third-party application metadata as well as the binary storage location reference which was appended to the metadata during backup of the third-party application data.

At step 6, the download server 230 uses the binary storage location reference to request the third-party application binary data from the binary data storage 228.

At step 7, the third-party application binary data is extracted from the binary data storage 228 and sent to the download server 230.

At step 8, the download server 230 provides the requested third-party application binary and metadata directly to the client device backup transport 210. The client device backup transport 210 extracts the delivered data to a specific location in the client device storage associated with the storage of third-party application data. Each third-party application 202a, 202b, 202c for which data is restored to the device may have a distinct location within the client device storage designated for storage of data. Thus, the client device backup transport 210 implements the third-party application 202a, 202b, 202c onto the client device 201, restoring all third-party application settings and files.

The above-described restoration method may be performed during the setup process for setting up a new device. When an account is added to the client device 201, the client device's backup framework 208 may check for whether a backup is already stored in cloud storage. If so, the third-party application data is restored for each third-party application 202a, 202b, 202c. For example, the client device 201 queries the backup server 218 about a third-party application 202a, 202b, or 202c. If the backup server 218 provides a success signal to the client device 201, this may indicate that a backup of the application exists in the cloud storage.

If it is determined during a restore request that there exists a backup of the third-party application data for a particular requested third-party application 202a, 202b, 202c, the process of downloading the third-party application data begins. The binary data storage location reference is retrieved from the stored metadata. Using the binary data storage location reference to locate the appropriate third-party application binary data in the binary data storage 228, the tarball file (.tar archive file) is downloaded from the binary data storage 228 by the download server 230. The download server 230 serves the third-party application data to the client device 201. If a backup for a requested third-party application is not identified, alternative means of restoring third-party application settings will be attempted, including key-value pairs.

Restoring the third-party application data from cloud storage onto a new device allows the user to experience the same environment and settings in third-party applications 202a, 202b, 202c on the device and the same environment within the third-party application 202a, 202b, 202c as on a previous device upon restore. This may include user preferences such as what the application looks like and how it functions. Data specific to the application including data stored in the application is also restored. For example, stored data for a third-party application which is a text messaging application might include texts, photos, audiofiles, text message history and contacts. These would be stored in the cloud storage by the described upload method and restored to the device by a restore request. Following the restoration of third-party application data, the backup of the third-party application data is maintained in cloud storage for use in additional restore or download requests.

In some embodiments, a user may initiate a restore request in order to sync a second device with a first device which has uploaded third-party application data to cloud storage. The user may initiate a restore process which functions as a means to sync the third-party applications 202a, 202b, 202c between the two devices so that the third-party applications 202a, 202b, 202c contain the same application settings, environments and content.

In some embodiments, the systems and methods of the present disclosure may be implemented in a manner that maintains backwards compatibility with existing backup methods. The restoration process may give a user the option of restoring third-party application data from a backup which was created with an older version of the backup protocol, for example a backup protocol which relies on the use of key-value pairs. In this way, a client device 201 operating with the software required for backup and restore according to the method described here, may request a restore from a backup made using a previous backup method. A user can also restore third-party application data from a backup made with the described method while using backup and restore software which is older. The restore made with older backup and restore software will succeed, as the older backup software will ignore the success signal containing the metadata storage location reference as well as the new data and will rely instead on key-value pairs stored with the metadata for the restore.

The backup and restore method is backwards compatible and does not require the migration of previous backups executed by the key-value pair method to be migrated. The method of backup described here is compatible with backups including key-value pairs. Additionally, the use of the described backup method requires an initial full backup of all application data in order to establish a full record of the third-party application files. These files are used for comparison to the third-party application data existing on the client device in order to determine the need for a backup. The full initial backup of a third-party application 202a, 202b, 202c upon receiving access to the backup method eliminates the need for any previous key-value pair back up files. In some embodiments, the key-value pairs containing third-party application data which were previously backed up are also backed up as part of the full data backup.

When a device is decommissioned, the third-party application data previously stored on the device may be restored to a new device. However, decommissioned devices may lead to the existence of "orphaned datasets" where the third-party application data has been stored in the cloud but is no longer connected to a user or functioning client device 201. Methods may be undertaken to remove these orphaned datasets. Orphaned datasets may be set to expire after some period of time. Alternatively, a user may signal that a device has been decommissioned or will become inactive through a user interface on the device or in a user account associated with the client device 201.

During phase-in of the new backup and restore method, there may be an overwhelming amount of data flow to cloud storage as third-party application data for client devices 201 are backed up in full. During the initial roll-out of this backup feature, the upload flow may be controlled by mechanisms on both the client and server side. For example, user access to the upload and restore functions may be limited based on the device. The client device may be configured so as to set or disable a feature on a particular client device or client device model. Alternatively, the feature may be rolled out to only a percentage of users of the client device, allowing time for the initial uploads of third-party application data to occur for these users before rolling out the feature to an additional percentage of users. Additionally, the access to the upload and restore feature may be limited based on the third-party application, with more third-party applications being covered by the upload and restore functionality over time. The configurations of the backup period can also be changed in order to control the data flow by toggling between two modes. According to a first mode, the upload process may be initiated when there is a sufficient amount of change to the third-party application data. According to a second mode, the upload process may be initiated based on a predetermined schedule, such as once every N days.

On the server side, the flow of data may be controlled by the implementation of throttling levers on the servers such as flags or feature switches. The flags or feature switches are readable by the upload server and the backup server. Above set server limits the flag returns a custom error code indicating a failure due to throttling. This custom error code also includes a field indicating a time period advisable to wait before another attempt is made. Additional flags may also be incorporated in order to protect downstream services in emergencies which would disable the entire upload call.

Figure 5:
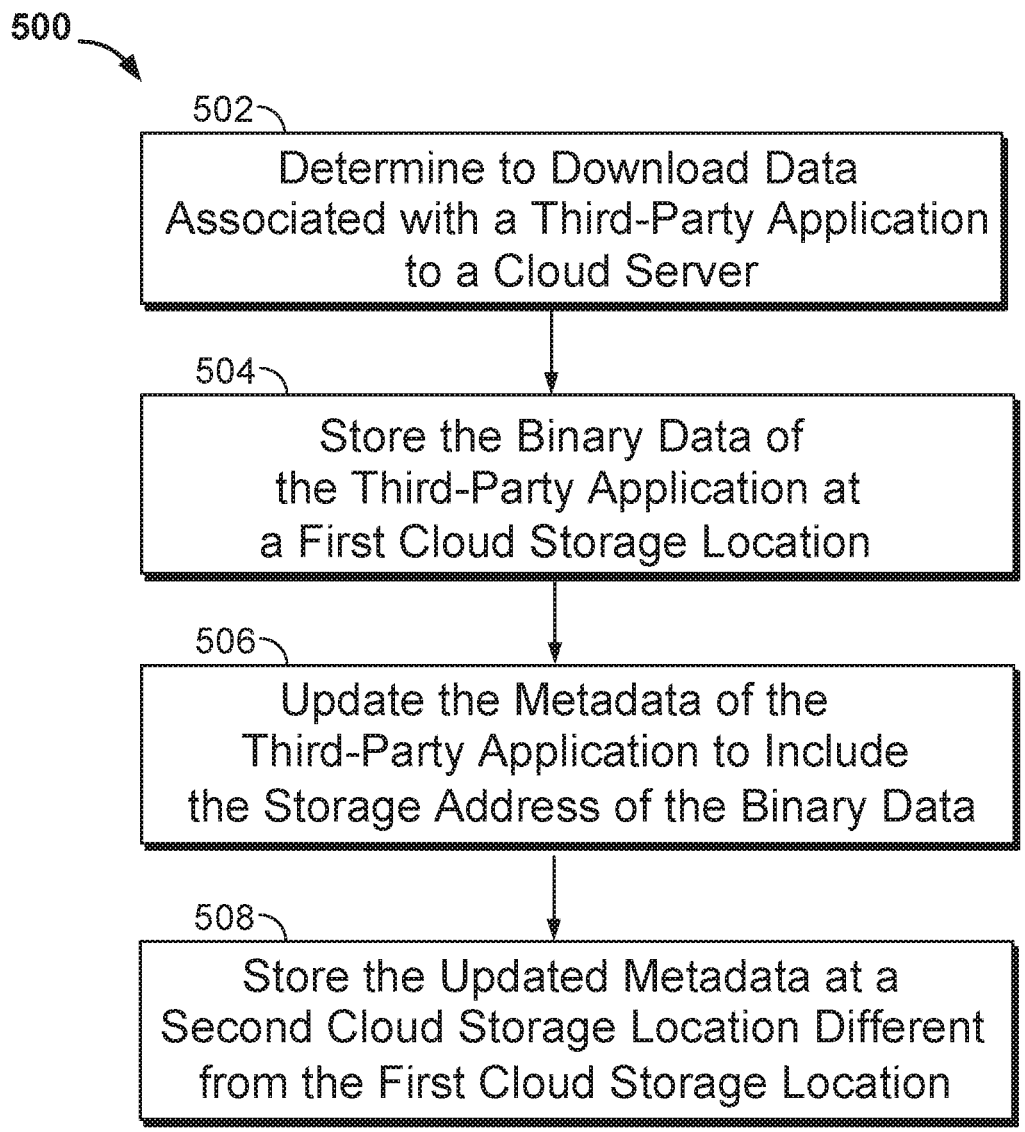
FIG. 5 shows a flow chart of a method for storing third-party application data to cloud storage, according to an illustrative embodiment.

FIG. 5 shows a flowchart illustrating a method 500 for storing third-party application data to cloud storage. The method 500 includes the steps of determining to download data associated with a third-party application to a cloud storage server (step 502), storing the binary data of the third-party application at a first cloud storage location (step 504), updating the metadata to include the storage address of the first cloud storage location (step 506), and storing the updated metadata to a second cloud storage location different from the first cloud storage location (step 508).

In step 502, the client device backup framework (e.g., 208 in FIG. 2) determines that data associated with a third-party application on a client device should be downloaded to a cloud storage server. The requirement to download third-party application data to a cloud storage server may be determined based on a scheduled download, a user request to upload the data or a change in third-party application data. In some implementations, the requirement to download third-party application data may be determined by a comparison between third-party application data currently stored in the cloud storage server to the third-party application data stored on the client device using a checksum method. The third-party application data to be downloaded to cloud storage includes both binary data and metadata.

In step 504, the binary data is stored in a first cloud storage location. The cloud storage location has an associated storage address. The binary data associated with the third-party application is sent from the client device backup transport (e.g., 210 in FIG. 2) to the upload server as a data tarball (e.g., .tar archive file). The binary data is stored in a first cloud storage location designed for the storage of large amounts of binary data.

In step 506, the metadata associated with the third-party application is updated to include the storage address of the first cloud storage location. The cloud storage service (e.g., 203 in FIG. 2) appends the binary storage address to the metadata. The binary data can thus be associated with the third-party metadata and may be retrieved using the cloud storage address in the updated metadata. The storage location may be a numerical string pointing to the file location of the third-party application binary data. In some implementations, the cloud storage service may also append additional descriptors and instructions to the metadata before storage.

In step 508, the updated metadata is stored at a second cloud storage location. The second cloud storage location is different than the first cloud storage location and is optimized for the storage of metadata. A success signal may be returned to the upload server following successful storage of the binary data and metadata. The success signal may additionally include a reference to the location of the metadata to be used to access the metadata.

Figure 6:
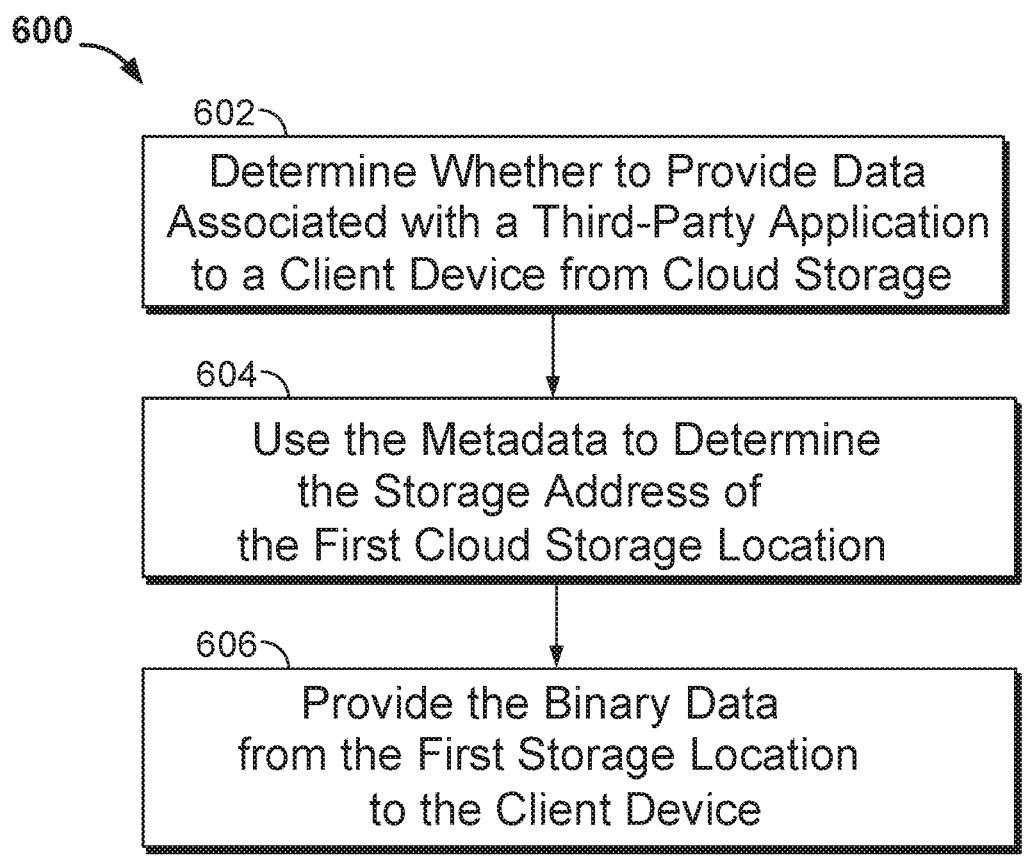
FIG. 6 shows a flow chart of a method for providing restoration of third-party application data to a client device, according to an illustrative embodiment.

FIG. 6 shows a flowchart illustrating a method 600 for providing restoration of third-party application data to a client device. The method 600 includes the steps of determining whether to provide data associated with a third-party application to a client device from cloud storage (step 602), using metadata to determine the storage address of the first cloud storage location (step 604), and providing binary data from the first storage location to the client device (step 606).

In step 602, it is determined whether a restoration is required to provide data associated with a third-party application to a client device. The restoration may be in response to a request or selection from a user or a request by a third-party application. The restoration may also be implemented as a synch between devices. The data associated with the third-party application includes both binary data stored in a first cloud location with a storage address and metadata stored in a second cloud storage location. The client device backup transport (e.g., 210 in FIG. 2) initiates the data download by sending a device ID associated with the client device and a third-party application ID associated with a third-party application to the backup server (e.g., 218 in FIG. 2).

Step 604 includes using the previously stored metadata associated with the third-party application to determine the storage address of the binary data. After receiving the identifying information including the device ID and third-party application ID, the backup server sends the success signal from the last successful backup of the third-party application data to the client device. The success signal includes a reference to the metadata storage location. The metadata can then be retrieved from the metadata storage in order to obtain the binary storage location reference which was appended to the metadata during a previous backup of third-party application data.

In step 606, the retrieved binary data storage location address is used to locate and request the binary data associated with the third-party application. The binary data and the metadata are transmitted by the download server to the client device via the backup transport. The binary data and metadata is delivered to storage on the client device.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for storing mobile device data to cloud storage, the method comprising:
   detecting, by a first mobile device of a user, a predetermined condition to backup data associated with the first mobile device to the cloud storage; and
   in response to detecting the predetermined condition, automatically performing operations for generating a plurality of single files for a plurality of third party applications hosted by the first mobile device, wherein for each third-party application of the plurality of third party applications hosted by the mobile device, a set of performed operations comprises:
      identifying, by the first mobile device data associated with a respective third-party application stored on the first mobile device, wherein the data associated with the respective third-party application includes binary data and metadata, the binary data comprising settings of the respective third-party application, history of the respective third-party application, and content of the respective third-party, the binary data being separate from and having different format than the metadata of the respective third-party application;

aggregating, by the first mobile device, the binary data and the metadata of the respective third-party application into a single file of the respective third-party application; and backing up the single file of the respective third-party application to an upload server in the cloud storage, wherein the binary data of the respective third-party application is to be separated from the metadata of the respective third-party application and stored in a first cloud storage location of the cloud storage, and wherein the metadata of the respective third-party application is to be updated with an appended separate storage address of the first cloud storage location and stored in a second cloud storage location of the cloud storage, wherein the plurality of single files of the plurality of third-party applications are stored in the cloud storage for subsequent restoring of the binary data and the metadata of each third-party application of the plurality of third party applications to a second mobile device of the user.

2. The method of claim 1, wherein the first mobile device determines whether to backup the data by:
identifying stored binary data associated with the respective third-party application that is stored on the first mobile device;
identifying previously backed up binary data associated with the respective third-party application;
computing a difference between the stored binary data and the previously backed up binary data; and
comparing the difference to a threshold.

3. The method of claim 2, wherein if the difference is equal to or exceeds the threshold, the first mobile device determines to back up the data associated with the respective third-party application.

4. The method of claim 1, wherein the first mobile device stores data associated with a plurality of third-party applications, each third-party application in the plurality of third-party applications is associated with corresponding binary data and corresponding metadata, and the corresponding binary data and the corresponding metadata for each third-party application are backed up from the first mobile device in a single upload.

5. The method of claim 4, wherein the data associated with the respective third party application is not duplicated in full on the first mobile device prior to transmitting the binary data and the metadata.

6. The method of claim 1, wherein the binary data of the respective third-party application includes full data for the respective third-party application.

7. The method of claim 1, wherein the predetermined condition comprises a predetermined upload schedule.

8. The method of claim 1, wherein the predetermined condition comprises detection of changes to the respective third-party application data reported by the respective third-party application.

9. The method of claim 1, wherein the predetermined condition comprises receiving, by the first mobile device, a backup request from a user of the first mobile device.

10. A system to store data associated with a first mobile device of a user to cloud storage, comprising:
a memory; and
a processing device, coupled to the memory, to:
detect a predetermined condition to backup the data associated with the first mobile device to the cloud storage; and
in response to detecting the predetermined condition, automatically perform operations for generating a plurality of single files for a plurality of third party applications hosted by the first mobile device, wherein for each third-party application of the plurality of third party applications hosted by the mobile device, a set of performed operations comprises:
identifying data associated with a respective third-party application stored on the first mobile device, wherein the data associated with the respective third-party application includes binary data and metadata, the binary data comprising settings of the respective third-party application, history of the respective third-party application, and content of the respective third-party, the binary data being separate from and having different format than the metadata of the respective third-party application;
aggregating the binary data and the metadata of the respective third-party application into a single file of the respective third-party application; and
backing up the single file of the respective third-party application to an upload server in the cloud storage, wherein the binary data of the respective third-party application is to be separated from the metadata of the respective third-party application and stored in a first cloud storage location of the cloud storage, and wherein the metadata of the respective third-party application is to be updated with an appended separate storage address of the first cloud storage location and stored in a second cloud storage location of the cloud storage,
wherein the plurality of single files of the plurality of third-party applications are stored in the cloud storage for subsequent restoring of the binary data and the metadata of each third-party application of the plurality of third party applications to a second mobile device of the user.

11. The system of claim 10, wherein the processing device to store data associated with a plurality of third-party applications, each third-party application in the plurality of third-party applications is associated with corresponding binary data and corresponding metadata, and the corresponding binary data and the corresponding metadata for each third-party application are backed up from the first mobile device in a single upload.

12. The system of claim 11, wherein the data associated with the respective third party application is not duplicated in full on the first mobile device prior to transmitting the binary data and the metadata.

13. The system of claim 10, wherein the binary data of the respective third-party application includes full data for the respective third-party application.

14. The system of claim 10, wherein to determine whether to back up the data, the processing device to:
identify stored binary data associated with the respective third-party application that is stored on the first mobile device;
identify previously backed up binary data associated with the respective third-party application;

compute a difference between the stored binary data and the previously backed up binary data;

compare the difference to a threshold; and responsive to determining that the difference is equal to or exceeds the threshold, determine to back up the data associated with the respective third-party application.

15. The system of claim 10, wherein to detect the predetermined condition, the processing device to detect at least one of a predetermined upload schedule, a change to the respective third-party application data reported by the respective third-party, or a backup request received from a user of the first mobile device.

16. A non-transitory computer-readable medium to store instructions, which when executed by one or more processing devices, cause the one or more processing devices to:

detect a predetermined condition to backup data associated with a first mobile device of a user to cloud storage; and in response to detecting the predetermined condition, automatically perform operations for generating a plurality of single files for a plurality of third party applications hosted by the first mobile device, wherein for each third-party application of the plurality of third party applications hosted by the mobile device, a set of performed operations comprises:

identifying data associated with a respective third-party application stored on the first mobile device, wherein the data associated with the respective third-party application includes binary data and metadata, the binary data comprising settings of the respective third-party application, history of the respective third-party application, and content of the respective third-party, the binary data being separate from and having different format than the metadata of the respective third-party application;

aggregating the binary data and the metadata of the respective third-party application into a single file of the respective third-party application; and backing up the single file of the respective third-party application to an upload server in the cloud storage, wherein the binary data of the respective third-party application is to be separated from the metadata of the respective third-party application and stored in a first cloud storage location of the cloud storage, and wherein the metadata of the respective third-party application is to be updated with an appended separate storage address of the first cloud storage location and stored in a second cloud storage location of the cloud storage, wherein the plurality of single files of the plurality of third-party applications are stored in the cloud storage for subsequent restoring of the binary data and the metadata of each third-party application of the plurality of third party applications to a second mobile device of the user.

17. The computer-readable media of claim 16, wherein to determine whether to back up the data, the one or more processing devices to:

identify stored binary data associated with the respective third-party application that is stored on the first mobile device;

identify previously backed up binary data associated with the respective third-party application;

compute a difference between the stored binary data and the previously backed up binary data;

compare the difference to a threshold; and responsive to determining that the difference is equal to or exceeds the threshold, the one or more processing devices determine to back up the data associated with the respective third-party application.

18. The computer-readable media of claim 16, wherein the one or more processing devices to store data associated with a plurality of third-party applications, each third-party application in the plurality of third-party applications is associated with corresponding binary data and corresponding metadata, and the corresponding binary data and the corresponding metadata for each third-party application are backed up from the first mobile device in a single upload.

19. The computer-readable media of claim 16, wherein the data associated with the respective third party application is not duplicated in full on the first mobile device prior to transmitting the binary data and the metadata.

20. The computer-readable media of claim 16, wherein to detect the predetermined condition, the one or more processing devices to detect at least one of a predetermined upload schedule, a change to the respective third-party application data reported by the respective third-party, or a backup request received from a user of the first mobile device.

* * * * *